(12) United States Patent
Malysh et al.

(10) Patent No.: US 11,082,399 B2
(45) Date of Patent: Aug. 3, 2021

(54) VIRTUAL SWITCH BYPASS

(71) Applicant: Microsoft Technology Licensing, LLC, Redmond, WA (US)

(72) Inventors: Alexander Malysh, Bothell, WA (US); Omar Cardona, Bellevue, WA (US); Madhan Sivakumar, Seattle, WA (US); Alireza Dabagh, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 173 days.

(21) Appl. No.: 16/101,106

(22) Filed: Aug. 10, 2018

(65) Prior Publication Data

US 2020/0053050 A1 Feb. 13, 2020

(51) Int. Cl.
*H04L 29/06* (2006.01)
*G06F 9/455* (2018.01)
*H04L 12/721* (2013.01)
*H04L 12/931* (2013.01)

(52) U.S. Cl.
CPC ...... *H04L 63/0254* (2013.01); *G06F 9/45558* (2013.01); *H04L 45/66* (2013.01); *H04L 49/70* (2013.01); *H04L 63/029* (2013.01); *G06F 2009/45587* (2013.01); *G06F 2009/45591* (2013.01); *G06F 2009/45595* (2013.01)

(58) Field of Classification Search
CPC ....... G06F 9/45558; G06F 2009/45587; G06F 2009/45591; G06F 2009/45595; H04L 45/66; H04L 49/70; H04L 63/0254; H04L 63/029
See application file for complete search history.

(56) References Cited

U.S. PATENT DOCUMENTS

| | | | |
|---|---|---|---|
| 7,865,908 B2 | 1/2011 | Garg et al. | |
| 9,176,767 B2 | 11/2015 | Cantu | |
| 9,699,060 B2* | 7/2017 | Singaravelu | ............ H04L 43/16 |
| 10,432,745 B2* | 10/2019 | Daly | ..................... H04L 69/324 |

(Continued)

OTHER PUBLICATIONS

"International Search Report and Written Opinion Issued in PCT Application No. PCT/US2019/039358", dated Aug. 30, 2019, 15 Pages.

(Continued)

*Primary Examiner* — Thomas J Dailey
(74) *Attorney, Agent, or Firm* — Holzer Patel Drennan (57) ABSTRACT

A method of communicating data traffic including data packets through a virtual switch on a host device is provided. The data traffic flowing through the virtual switch is monitored. The data traffic includes at least virtual machine data traffic flowing to and from virtual machine processes on the host device and host data traffic flowing to and from host operating system processes on the host device. Each of the data packets are designated as virtual machine data traffic or host data traffic based on an evaluation of the Media Access Controller (MAC) address of each of the one or more data packets of the monitored data traffic. Virtual machine data traffic is directed through a packet processor as the virtual machine data traffic traverses the virtual switch. Host data traffic is directed to bypass the packet processor as the host data traffic traverses the virtual switch.

20 Claims, 6 Drawing Sheets

(56) References Cited

U.S. PATENT DOCUMENTS

| | | | |
|---|---|---|---|
| 2008/0043765 A1* | 2/2008 | Belgaied | H04L 12/4679 |
| | | | 370/409 |
| 2011/0090915 A1 | 4/2011 | Droux et al. | |
| 2012/0198441 A1* | 8/2012 | Mahdavi | H04L 12/6418 |
| | | | 718/1 |
| 2013/0067466 A1* | 3/2013 | Combs | G06F 9/455 |
| | | | 718/1 |
| 2014/0215463 A1 | 7/2014 | Hendel et al. | |
| 2015/0033222 A1* | 1/2015 | Hussain | H04L 49/50 |
| | | | 718/1 |
| 2016/0232019 A1 | 8/2016 | Shah et al. | |
| 2017/0099188 A1* | 4/2017 | Chang | H04L 63/20 |
| 2017/0214612 A1 | 7/2017 | Leitner | |
| 2018/0157514 A1 | 6/2018 | Malloy et al. | |

OTHER PUBLICATIONS

"Simplified, High-Performance 10GbE Networks based on a Single Virtual Distributed Switch, Managed by VMware vSphere* 5.1", Retrieved from https://web.archive.org/web/20121224152222/https:/www.intel.com/content/dam/www/public/us/en/documents/technology-briefs/vmware-vsphere-high-performance-network-brief.pdf, Dec. 24, 2012, pp. 1-12.

* cited by examiner

VIRTUAL SWITCH BYPASS

BACKGROUND

In datacenters comprised of multiple host computing devices, traffic flowing to a host device is often routed through a virtual switch. The virtual switch may include filters for incoming and outgoing traffic to prevent undesirable traffic from reaching the host computing device. For example, the virtual switch may include packet processing layers, such as filters that perform virus scans of incoming traffic and block traffic that may have a virus. The filters may also block or allow traffic based on filtering policies. A filtering policy may, for example, only allow traffic from known sources to pass through the filter. In addition to filtering, packet processing may include other activities, such as encapsulating or decapsulating traffic based on the network virtualization policy. Packet processing uses up processing time and resources and may not be useful for all types of traffic flowing to and from a host device.

SUMMARY

The described technology addresses one or more of the foregoing problems by providing a method of communicating data traffic including one or more data packets through a virtual switch on a host device. The data traffic flowing through the virtual switch is monitored. The data traffic includes at least virtual machine data traffic flowing to and from virtual machine processes on the host device and host data traffic flowing to and from host operating system processes on the host device. Each of the one or more data packets of the monitored data traffic are designated as virtual machine data traffic or host data traffic based on an evaluation of the Media Access Controller (MAC) address of each of the one or more data packets of the monitored data traffic. Virtual machine data traffic is directed through a packet processor as the virtual machine data traffic traverses the virtual switch. Host data traffic is directed to bypass the packet processor as the host data traffic traverses the virtual switch.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Other implementations are also described and recited herein.

DETAILED DESCRIPTIONS

Generally, all traffic originating from or destined for a host computing device is filtered through the virtual switch. Filtering may add additional processing time and resources. Some host computing device traffic, such as traffic originating from or destined for a host operating system (OS) on the host computing device is, by definition, from a trusted source. Accordingly, traffic originating from or destined for the host OS may bypass the filtering operations of the virtual switch. Bypassing the various filters in the virtual switch saves processing time, resources, and CPU cycles.

When traffic originating from or destined for the host OS bypasses the filters when traversing the virtual switch, network performance is improved for all types of traffic traversing the virtual switch. For example, traffic originating from or destined for virtual machines executing on a computing device does not bypass the filters of the virtual switch. Because traffic originating from or destined for the host OS does bypass the filters, filtering the remainder of the traffic is more efficient. Accordingly, traffic originating from or destined for virtual machines executing on the virtual switch traverses the virtual switch more quickly, meaning that the virtual machines executing on the virtual switch run more quickly.

Figure 1:
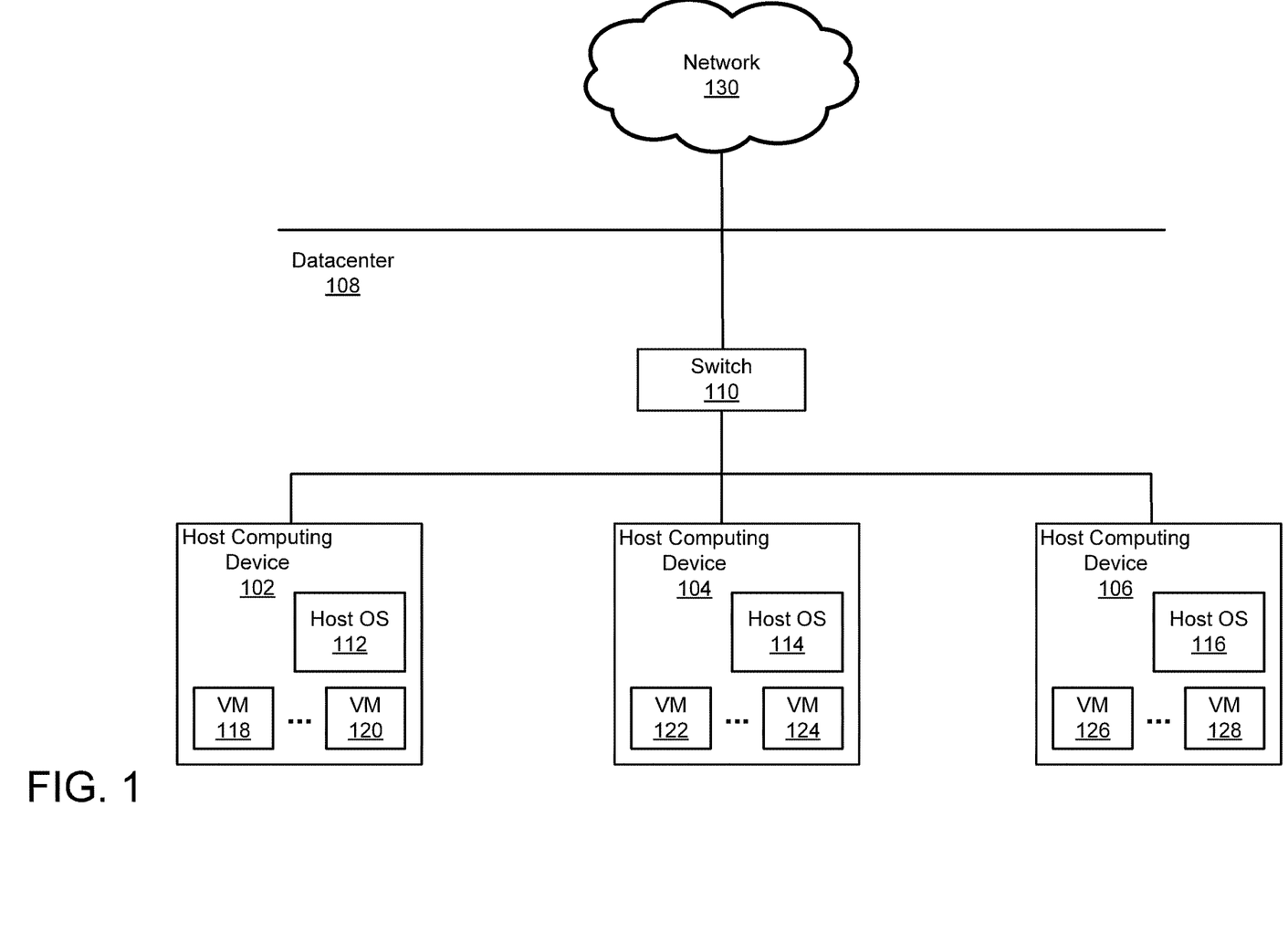
FIG. 1 illustrates an example system including a datacenter in communication with a network, showing one type of environment that may use virtual switch bypass.

FIG. 1 illustrates an example system 100 including a datacenter 108 in communication with a network 130, showing one type of environment that may use virtual switch bypass. The system 100 includes a datacenter 108 that includes without limitation a switch 110 and the host computing devices 102, 104, and 106. The host devices 102, 104, and 106 include a host operating system (host OS) (e.g., host OS 112, 114, and 116). The host computing devices 102, 104, and 106 each include one or more virtual machines. For example, the host computing device 102 includes a virtual machine 118 and a virtual machine 120, the host computing device 104 includes a virtual machine 122 and a virtual machine 124, and the host computing device 106 includes a virtual machine 126 and a virtual machine 128.

A virtual machine is an emulation of a computer system and is typically isolated from the operating system kernel of a host computing device. Virtual machines are based on various computer architectures and provide virtual machine processing providing the functionality of a separate physical computer within the host computing device. The interaction between the virtual machine and the operating system and resources of the host devices can be managed by a thin layer of software called a "hypervisor" that decouples the virtual machine from the host and dynamically allocates computing resources to each virtual machine as needed. Virtual machine implementations may involve specialized hardware, software, or a combination.

Data flows into the datacenter 108 from the network 130 in the form of data packets, including a source media access control (MAC) address and a destination MAC address. Data packets flowing into the datacenter 108 go through a switch 110. The switch 110 routes the data packets to the appropriate host computing device 102, 104, or 106 within the datacenter 108. Similarly, data packets originating from the host computing devices 102, 104, and 106 go through the switch 110 to be routed to the appropriate destination.

When data packets reach the appropriate host computing device 102, 104, or 106, a virtual switch (not shown) on the host computing device 102, 104, or 106 routes the data packet to the appropriate destination on the host computing device 102, 104, or 106. For example, a data packet received from the network 130 destined for the virtual machine 120 on the host computing device 102 would first be routed to the host computing device 102 by the switch 110. The virtual switch on the host computing device 102 would then route the data packet to the virtual machine 120. The virtual switch also performs some filtering and other processing of the data packet. In contrast, a data packet destined for the host OS 112 on the host computing device 102 would be routed to the host OS 112 by the virtual switch without being filtered. Virtual switch bypass may also be used in a variety of other computing environments.

Figure 2:
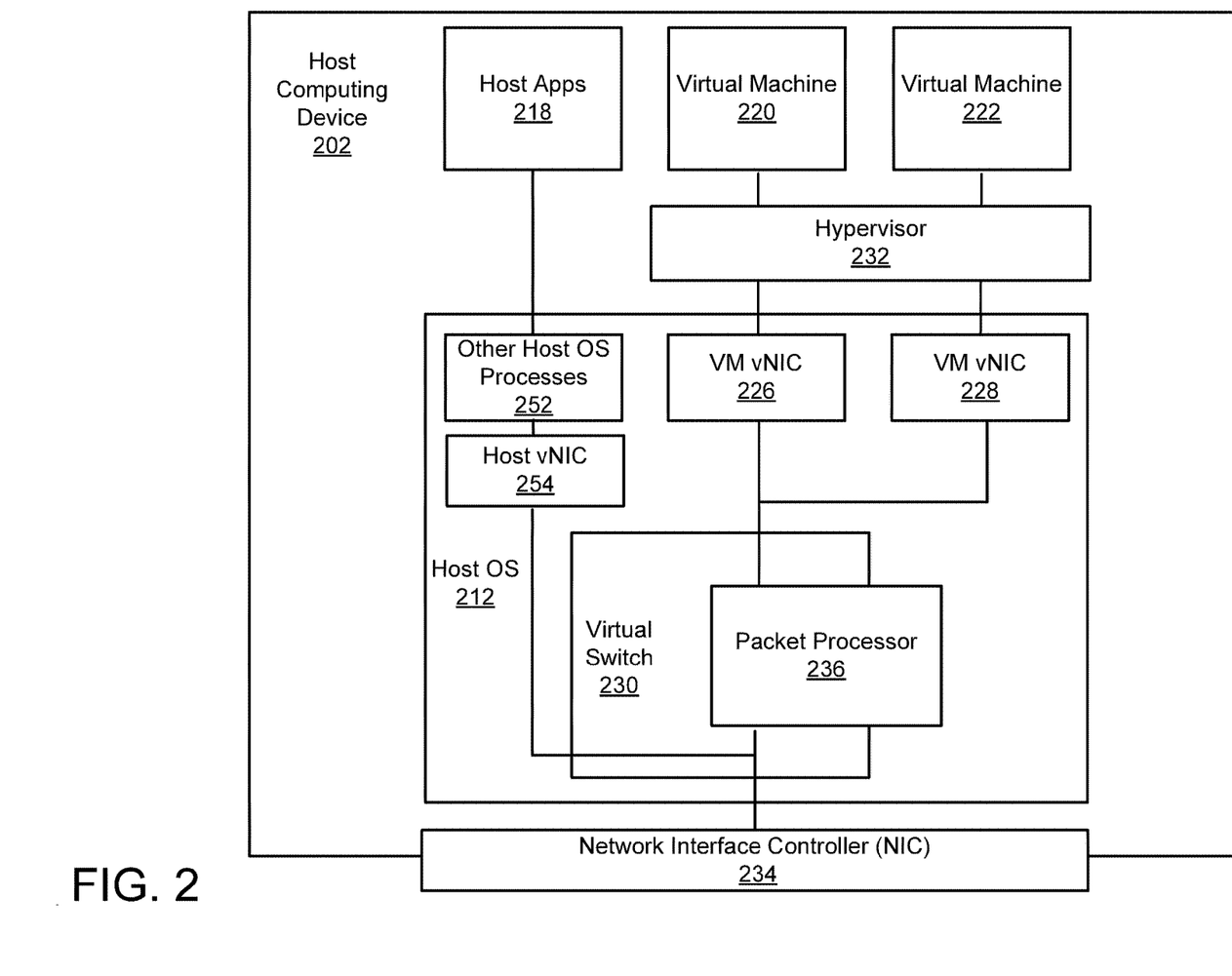
FIG. 2 illustrates an example virtual switch including a packet processor executing on a host computing device.

FIG. 2 illustrates an example virtual switch 230 including a packet processor 236 executing on a host computing device 202. A virtual machine 220 and a virtual machine 222 are each executing on the host computing device 202. The virtual machines 220 and 222 are isolated from the host OS 212 and communicate with virtual machine virtual network interface controllers (vNICs) 226 and 228 through a hypervisor 232. The virtual machine vNICs 226 and 228 each have a unique MAC address corresponding to the virtual machines 220 and 222, respectively. For example, a data packet originating from the virtual machine 218 has a source MAC address corresponding to the virtual machine vNIC 224 and a data packet destined for the virtual machine 220 has a destination MAC address corresponding to the virtual machine vNIC 226.

The example virtual switch executes on a host OS 212. Traffic destined for the host OS 212 is communicated to the host OS 212 via a host vNIC 254. Other host processes 252 and host apps 218 may also execute on the host OS 212. The host vNIC 254 has a unique MAC address corresponding to the host vNIC 254. A data packet originating from the host OS 212 has a source MAC address corresponding with the host vNIC 254 and a data packet destined for the host OS 212 has a destination MAC address corresponding to the host vNIC 254.

Data packets having MAC addresses corresponding to a virtual machine vNIC in the host computing device having the virtual switch are considered data packets in the virtual machine data traffic. Similarly, data packets having MAC addresses corresponding to the host vNIC are host data traffic. Accordingly, data traffic destined for or originating from the virtual machine is virtual machine data traffic, and a data packet destined for or originating from the host OS is host data traffic.

Virtual machine data traffic can take many forms and perform many functions. For example, virtual machine data traffic may include traffic to and from enterprise client devices accessing data and functionality in a virtual machine corresponding to that enterprise (e.g., laptops of personnel from company ABC accessing data and functionality corresponding to a virtual machine allocated to company ABC.) Host data traffic can take several forms and perform different functions. For example, a network administrator of the datacenter may access the host OS to upgrade the host OS on the host computing device, to change the configurations settings on the host OS, or to modify user access to the host computing device.

Traffic flowing to the host computing device 202 is received at a network interface controller (NIC) 234. The NIC 234 communicates the data packets of the incoming traffic to the virtual switch 230, which includes a packet processor 236. The packet processor 236 may include one or more layers of filters. In some implementations, the packet processor 236 may also include switching logic.

The one or more layers of filters in the packet processor 236 may filter data packets based on a filtering policy. A filtering policy may instruct the packet processor 236 to permit a data packet with a specific characteristic to pass through the packet processor 236. A filtering policy may also block a data packet with a specific characteristic from passing through the packet processor 236. For example, in one implementation, a filtering policy may block data packets that are not received in response to a request from the host device 202. In another implementation, a filtering policy may allow only traffic originating from specific ports, indicated by a port ID.

In some implementations, other types of filtering may also occur in the packet processor 236. For example, virus scanning or other security scans of incoming data packets may occur in the packet processor 236. Further, the packet processor 236 may include switching logic or other packet processing layers. Other packet processing layers may include, for example and without limitation, traffic isolation, packet encapsulation, and packet decapsulation.

Incoming data traffic destined for the virtual machine the virtual machine 220 or the virtual machine 222 passes through the packet processor 236 as it traverses the virtual switch 230 and may be referred to as virtual machine data traffic. In contrast, data traffic destined for the host OS 212 traverses the virtual switch 230 without passing through the packet processor 236 and may be referred to as host data traffic. The bypass of the packet processor 236 for incoming host data traffic is discussed in more detail with reference to FIG. 3.

Outgoing data traffic originating from the virtual machines 220 or 222 or the host OS 212 also traverses the virtual switch 230 before leaving the host computing device 202 via the MC 234. Similar to the incoming data traffic, outgoing virtual machine data traffic passes through the packet processor 236 as it traverses the virtual switch 230. Host data traffic bypasses the packet processor 236 as it traverses the virtual switch 230. The bypass of the packet processor 236 for outgoing host data traffic is discussed in more detail with reference to FIG. 4.

Figure 3:
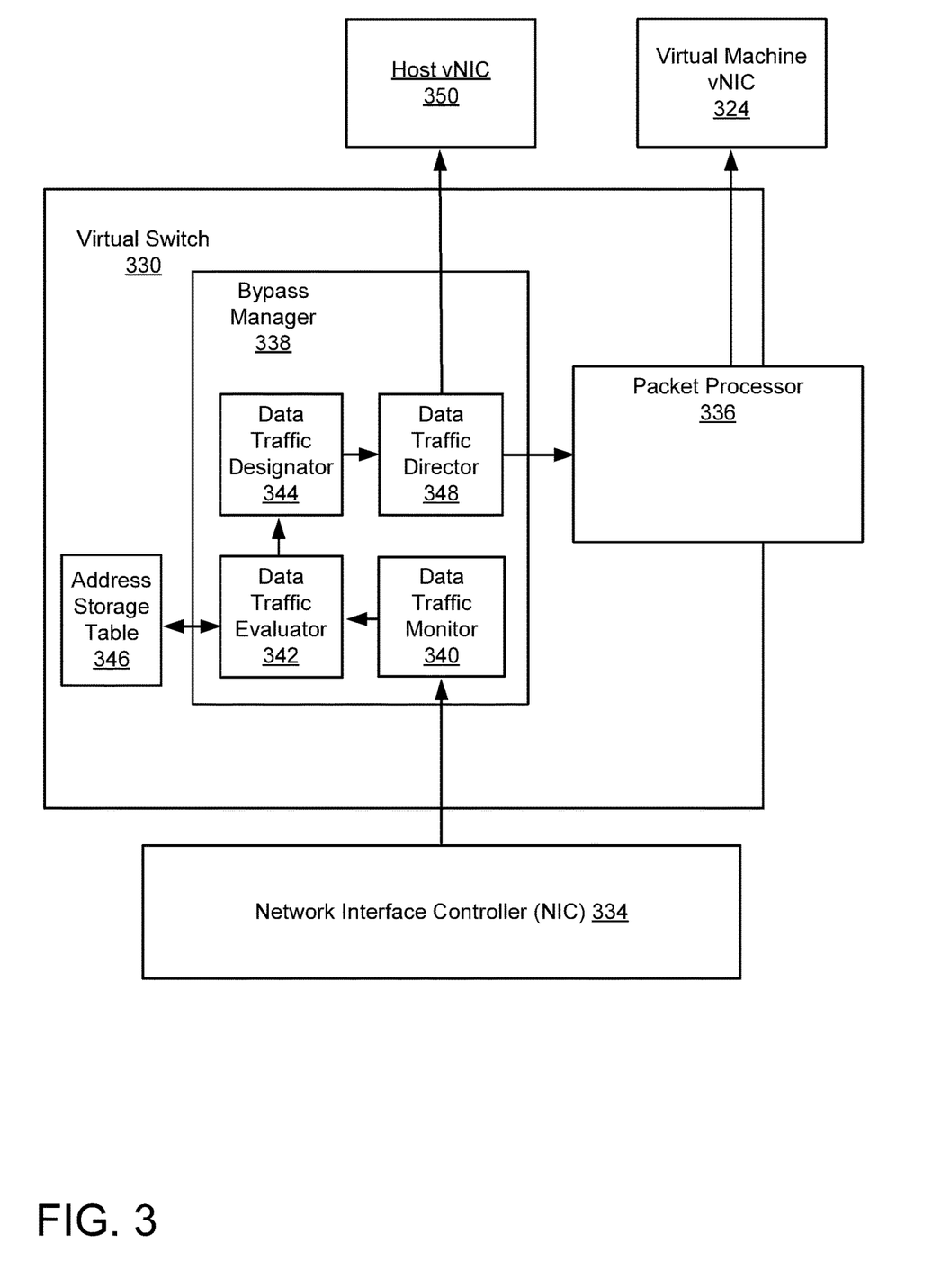
FIG. 3 illustrates an example flow of incoming data traffic as it traverses a virtual switch.

FIG. 3 illustrates an example flow of incoming data traffic as it traverses a virtual switch 330. Incoming data traffic is received at a NIC 334 of a host computing device. The NIC 334 passes the incoming data traffic to the virtual switch 330.

The virtual switch 330 includes a bypass manager 338 to determine whether each data packet of the incoming data traffic may bypass the packet processor 336. The bypass manager 338 includes a data traffic monitor 340, a data traffic evaluator 342, a data traffic designator 344, and a data traffic director 348. The data traffic monitor 340 receives the incoming data traffic from the MC 334 and monitors data traffic flowing to and from host operating system processes on the host computing device. The data traffic monitor 340 may also extract a destination MAC address from the data packets that make up the incoming data traffic.

The data traffic evaluator 342 receives the destination MAC addresses from the data traffic monitor 340 and compares the received MAC address to a list of known MAC addresses. The list of known MAC addresses may be stored on an address storage table 346 in communication with the data traffic evaluator 342. In one implementation, the list of known MAC addresses are MAC addresses that correspond to data traffic destined for virtual machines on host devices in a datacenter. In another implementation, the list of known MAC addresses are MAC addresses that correspond to data traffic destined for the host operating systems on the host devices in the datacenter. The data traffic evaluator 342 compares the extracted MAC address to the list of known MAC addresses to determine whether the extracted MAC address is on the list of known MAC addresses stored on the address storage table 346.

The data traffic designator 344 designates each of the one or more data packets of the incoming data traffic as virtual machine data traffic or host data traffic. In some implementations, data packets with an extracted MAC address matching a MAC address in the list of known MAC addresses are designated as host data traffic. Host designated traffic has a MAC address corresponding to data traffic originating from or destined for a host OS on the host computing devices in the datacenter. In other implementations, data packets with an extracted MAC address matching a MAC address in the list of known MAC addresses are designated as virtual machine data traffic. Virtual machine data traffic has a MAC address corresponding to data traffic originating from or destined for virtual machines on host computing devices in a datacenter.

The data traffic director 348 directs virtual machine data traffic to the packet processor 336 as the virtual machine data traffic traverses the virtual switch 330. The packet processor 336 may include one or more layers of filters. In some implementations, the packet processor 336 may also include switching logic. Once the filters of the packet processor 336 allow a data packet of virtual machine data traffic, the data packet is routed to a virtual machine vNIC 324. The data traffic director 348 also directs host traffic to bypass the packet processor 336 as the host data traffic traverses the virtual switch 330. Instead of passing through the packet processor 336, the host data traffic is directed to a host vNIC 350.

Figure 4:
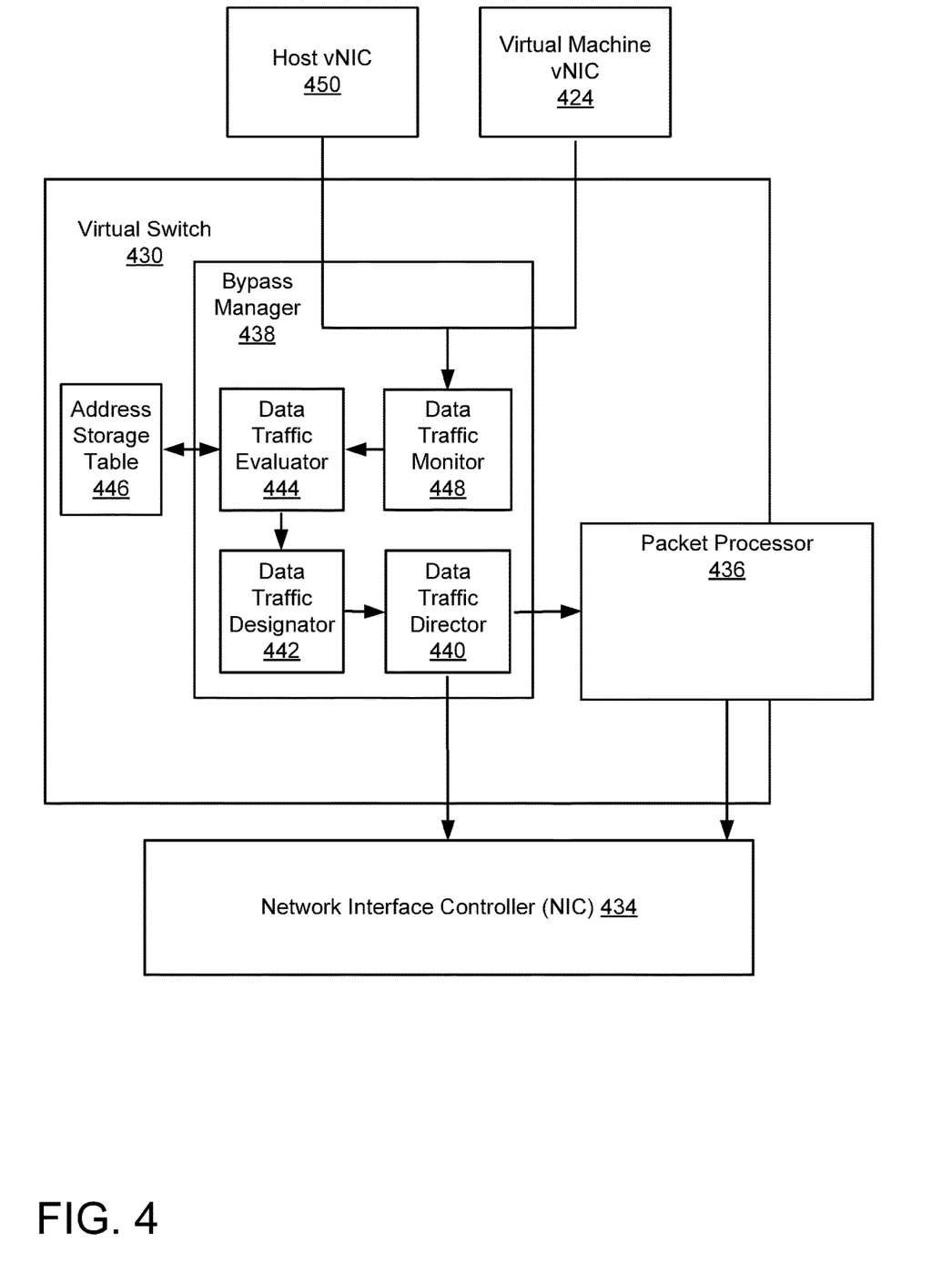
FIG. 4 illustrates an example flow of outgoing data traffic as it traverses a virtual switch.

FIG. 4 illustrates an example flow of outgoing data traffic as it traverses a virtual switch 430. Outgoing virtual machine data traffic originates at a virtual machine vNIC 424. Outgoing host data traffic originates at a host vNIC 450.

The virtual switch 430 includes a bypass manager 438 to determine whether each data packet of the outgoing data traffic may bypass the packet processor 436. The bypass manager 438 includes a data traffic monitor 440, a data traffic evaluator 442, a data traffic designator 444, and a data traffic director 448. The data traffic monitor 440 receives the outgoing data traffic from the virtual machine vNIC 424 and the host vNIC 450 and monitors data traffic flowing to and from host operating system processes on the host computing device. The data traffic monitor 440 may also extract a source MAC address from the data packets that make up the outgoing data traffic.

The data traffic evaluator 442 receives the source MAC addresses from the data traffic monitor 440 and compares the received MAC address to a list of known MAC addresses. The list of known MAC addresses may be stored on an address storage table 446 in communication with the data traffic evaluator 442. In one implementation, the list of known MAC addresses are MAC addresses that correspond to data traffic destined for virtual machines on host devices in a datacenter. In another implementation, the list of known MAC addresses are MAC addresses that correspond to data traffic destined for the host operating systems on the host devices in the datacenter. The data traffic evaluator 442 compares the extracted MAC address to the list of known MAC addresses to determine whether the extracted MAC address is on the list of known MAC addresses stored on the address storage table 346.

The data traffic designator 444 designates each of the one or more data packets of the incoming data traffic as virtual machine data traffic or host data traffic. In some implementations, data packets with an extracted MAC address matching a MAC address in the list of known MAC addresses are designated as host data traffic. In other implementations, data packets with an extracted MAC address matching a MAC address in the list of known MAC addresses are designated as virtual machine data traffic.

The data traffic director 448 directs virtual machine data traffic to the packet processor 436 as the virtual machine data traffic traverses the virtual switch 430. The packet processor 436 may include one or more layers of filters. In some implementations, the packet processor 436 may also include switching logic. Once the filters of the packet processor 436 allow a data packet of virtual machine data traffic, the data packet is routed to a NIC 434 for communication to its destination. The data traffic director 448 also directs host traffic to bypass the packet processor 436 as the host data traffic traverses the virtual switch 430. Instead of passing through the packet processor 436, the host data traffic is directed to the NIC 434.

Figure 5:
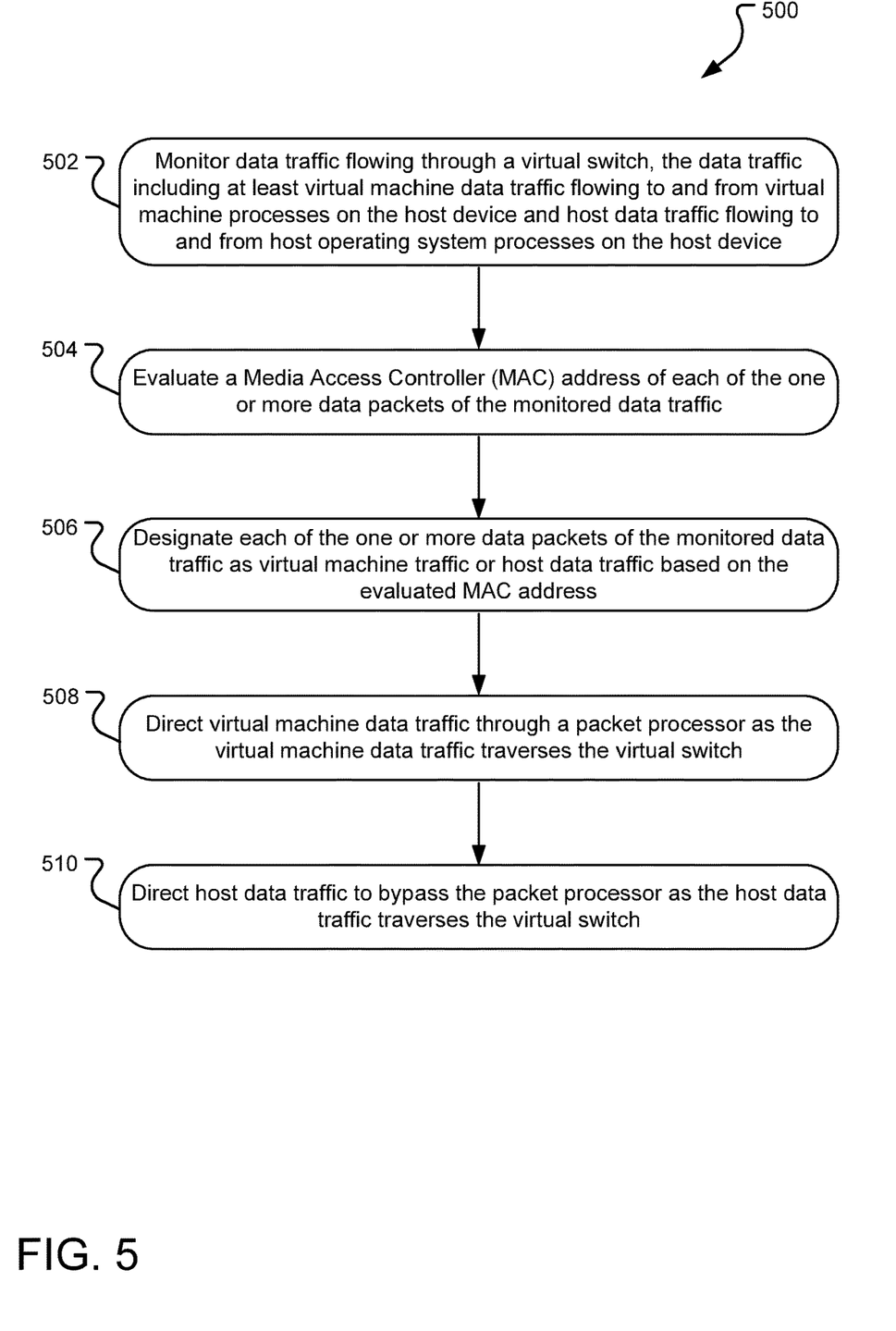
FIG. 5 illustrates example operations for communicating data traffic through a virtual switch on a host device.

FIG. 5 illustrates example operations 500 for communicating data traffic through a virtual switch on a host device. A monitoring operation 502 monitors data traffic flowing through the virtual switch. The data traffic includes at least virtual machine data traffic flowing to and from virtual machine processes on the host computing device and host data traffic flowing to and from host operating system processes on the host computing device. A data traffic monitor monitors data traffic flowing through the virtual switch and extracts a MAC address from one or more data packets that make up the data traffic. For incoming data traffic, the data traffic monitor extracts a destination MAC address. For outgoing data traffic, the data traffic monitor extracts a source MAC address.

An evaluating operation 504 evaluates a MAC address of each of the one or more data packets of the monitored data traffic. For incoming data traffic, the evaluating operation 504 may evaluate the destination MAC address of each of the data packets monitored in the monitoring operation 502. For outgoing data traffic, the evaluating operation 504 may evaluate the source MAC address of each of the data packets monitored in the monitoring operation 502.

A data traffic evaluator receives the extracted MAC address (i.e., the destination MAC address for incoming data traffic and the source MAC address for outgoing data traffic). The received MAC address is then compared to a list of known MAC addresses. In one implementation, the list of known MAC addresses are MAC addresses that correspond to data traffic originating from or destined for virtual machines on host devices in a datacenter. In another implementation, the list of known MAC addresses are MAC addresses that correspond to data traffic originating from or destined for the host operating systems on the host devices in the datacenter.

In one implementation, the list of known MAC addresses is stored on an address storage table in communication with the data traffic evaluator. The data traffic evaluator may compare the extracted MAC address to the list of known MAC addresses to determine whether the extracted MAC address is on the list of known MAC addresses stored on the address storage table.

A designating operation 506 designates each of the one or more data packets of the monitored data traffic as virtual machine traffic or host data traffic based on the evaluated MAC address. In some implementations, data packets with an extracted MAC address matching a MAC address in the list of known MAC addresses are designated as host data traffic. Host designated traffic has a MAC address corresponding to data traffic originating from or destined for a host OS on the host computing devices in the datacenter. In other implementations, data packets with an extracted MAC address matching a MAC address in the list of known MAC addresses are designated as virtual machine data traffic. Virtual machine data traffic has a MAC address corresponding to data traffic originating from or destined for virtual machines on host devices in a datacenter.

A first directing operation 508 directs virtual machine data traffic through a packet processor as the virtual machine data traffic traverses the virtual switch. The packet processor may include one or more layers of filters. In some implementations, the packet processor may also include switching logic.

The one or more layers of filters in the packet processor may filter data packets based on a filtering policy. A filtering policy may instruct the packet processor to permit a data packet with a specific characteristic to pass through the packet processor an on to the virtual machine indicated by the extracted MAC address of a data packet. A filtering policy may also block a data packet with a specific characteristic from passing through the packet processor. For example, in one implementation, a filtering policy may block data packets that are not received in response to a request from a virtual machine. In another implementation, a filtering policy may allow only traffic originating from specific ports, indicated by a port ID.

In some implementations, other types of filtering may also occur in the packet processor. For example, virus scanning or other security scans of incoming data packets may occur in the packet processor. Further, the packet processor may include switching logic or other packet processing layers.

A second directing operation 510 directs host data traffic to bypass the packet processor as the host data traffic traverses the virtual switch. Incoming host data traffic is directed to the host vNIC without passing through the packet processor. Outgoing host data traffic is directed to the host device MC without passing through the packet processor.

Figure 6:
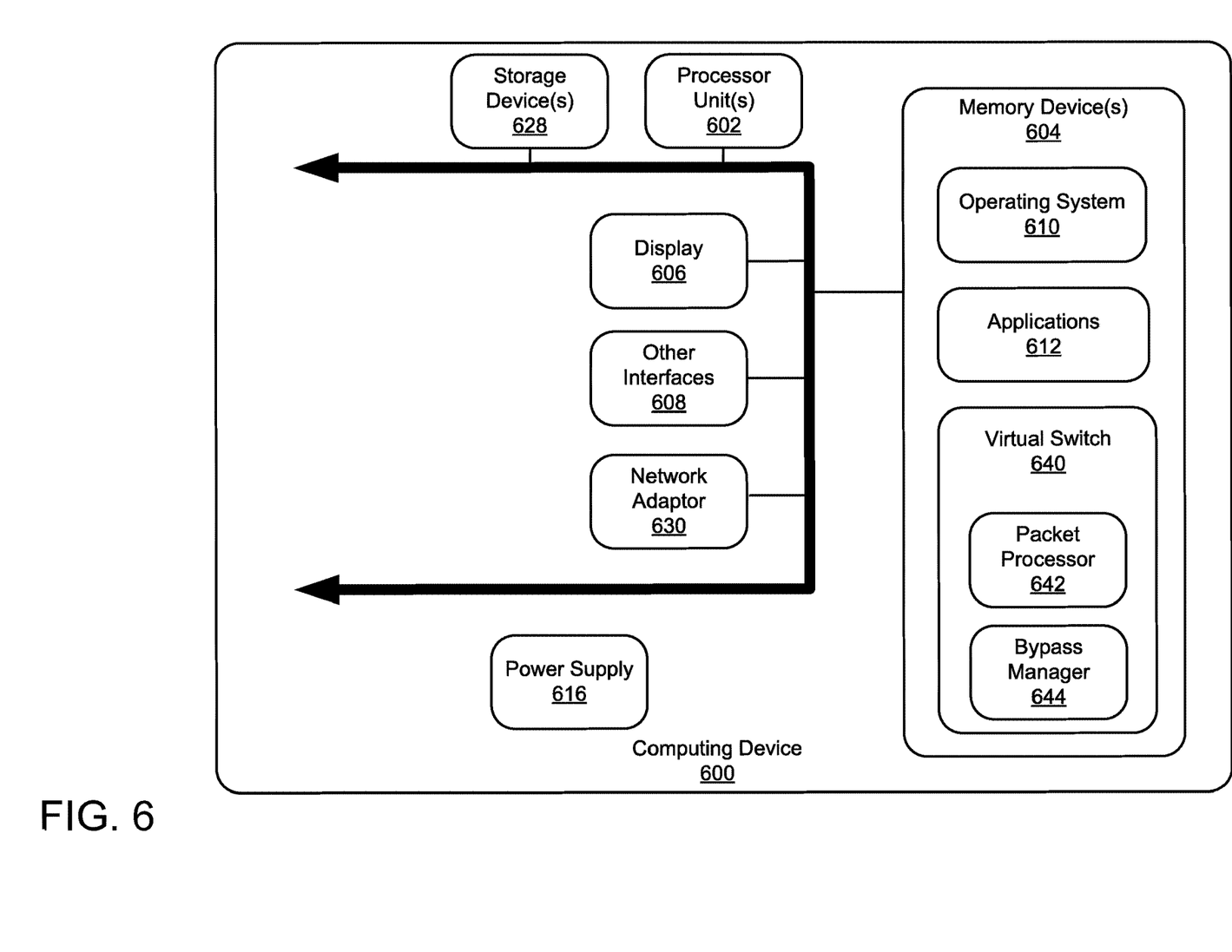
FIG. 6 illustrates an example computing device for use in communicating data traffic through a virtual switch on a host device.

FIG. 6 illustrates an example computing device 600 for use in implementing distributed stateless tunnels. The computing device 600 includes one or more processor units 602, one or more memory devices 604, a display 606 (e.g., a touchscreen display or lights), and other interfaces 608 (e.g., buttons). The memory device(s) 604 generally includes either or both of volatile memory (e.g., RAM) and non-volatile memory (e.g., flash memory). An operating system 610, such as the Microsoft Windows® operating system or the Microsoft Windows® Mobile operating system, resides in the memory 604 and is executed by the processor unit(s) 602, although it should be understood that other operating systems may be employed.

One or more applications 612 may be loaded in the memory device(s) 604 and executed on the operating system 610 by the processor unit(s) 602. A virtual switch 640 is also loaded into the memory device(s) 604 and executed by the processor unit(s) 602 or embedded on a network interface device (NIC). The computing device 600 includes a power supply 616, which is powered by one or more batteries or other power sources and which provides power to other components of the computing device 600. The power supply 616 may also be connected to an external power source that overrides or recharges the built-in batteries or other power sources.

The computing device 600 includes one or more network adaptors 630 The computing device 600 may also include various other components, such as a positioning system (e.g., a global positioning satellite transceiver), one or more accelerometers, one or more cameras, an audio interface (e.g., a microphone, an audio amplifier and speaker and/or audio jack), and one or more additional storage device(s) 628. Other configurations may also be employed.

In an example implementation, an operating system 610, various applications 612, a hypervisor, host processes, a virtual switch 640, a packet processor 642, a bypass manager 644, and other modules and services may be embodied by instructions stored in the memory device(s) 604 and/or storage device(s) 628 and processed by the processing unit(s) 602. Transformation rules, routing rules, and other data may be stored in memory device(s) 604 and/or storage device(s) 628 as persistent datastores. Another implementation of the virtual switch 640 may be implemented as hardware or as a combination of hardware and firmware on a network interface device.

The computing device 600 may include a variety of tangible computer-readable storage media and intangible computer-readable communication signals, or alternatively, tangible processor-readable storage media and intangible processor-readable communication signals. Tangible computer-readable storage and tangible processor-readable storage can be embodied by any available media that can be accessed by the computing device 600 and includes both volatile and nonvolatile storage media, removable and non-removable storage media. Tangible computer-readable/processor-readable storage media excludes intangible communications signals and includes volatile and nonvolatile, removable and non-removable storage media implemented in any method or technology for storage of information such as computer/processor readable instructions, data structures, program modules or other data. Tangible computer-readable/processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 600. In contrast to tangible computer-readable/processor-readable storage media, intangible computer-readable/processor-readable communication signals may embody computer/processor readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments may comprise an article of manufacture. An article of manufacture may comprise a tangible computer-readable/processor-readable storage medium to store logic. Examples of such a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer/processor program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

An example method of communicating data traffic including one or more data packets through a virtual switch on a host device is provided. The method includes monitoring the data traffic flowing through the virtual switch. The data traffic includes at least virtual machine data traffic flowing to and from virtual machine processes on the host device and host data traffic flowing to and from host operating system processes on the host device. The method also includes designating one or more data packets of the monitored data traffic as virtual machine data traffic based on an evaluation of a Media Access Controller (MAC) address of the one or more data packets of the monitored data traffic where the MAC address corresponds to a virtual machine virtual network interface controller. The method also includes designating further one or more data packets of the monitored data traffic as host data traffic based on an evaluation of the MAC address of the further one or more data packets of the monitored data traffic where the MAC address corresponds to a host virtual network interface controller. The method further includes directing the virtual machine data traffic through a packet processor as the virtual machine data traffic traverses the virtual switch and directing the host data traffic to bypass the packet processor as the host data traffic traverses the virtual switch.

A method of any previous method is provided, where the packet processor is configured to filter the one or more data packets of the virtual machine data traffic according to a filtering policy.

A method of any previous method is provided, where monitoring the data traffic flowing through the virtual switch includes extracting a MAC address from each of the one or more data packets of the data traffic.

A method of any previous method is provided, where the extracted MAC address of the data traffic flowing to the host device is a destination MAC address.

A method of any previous method is provided, where the extracted MAC address of the data traffic flowing from the host device is a source MAC address.

A method of any previous method is provided, where the evaluation of the MAC address of each of the one or more data packets of the monitored data traffic includes comparing the extracted MAC address of each of the one or more data packets to a list of known MAC addresses, the list of known MAC addresses associated with virtual machine data traffic or host data traffic.

A method of any previous method is provided, where the list of known MAC addresses is stored on an address storage table accessible by a bypass manager of the virtual switch.

An example system for communicating data traffic including one or more data packets through a virtual switch on a host device is provided. The example system includes means for monitoring the data traffic flowing through the virtual switch. The data traffic includes at least virtual machine data traffic flowing to and from virtual machine processes on the host device and host data traffic flowing to and from host operating system processes on the host device. The example system further includes means for designating one or more data packets of the monitored data traffic as virtual machine data traffic based on an evaluation of a Media Access Controller (MAC) address of the one or more data packets of the monitored data traffic where the MAC address corresponds to a virtual machine virtual network interface controller. The example system further includes means for designating further one or more data packets of the monitored data traffic as host data traffic based on an evaluation of the MAC address of the further one or more data packets of the monitored data traffic where the MAC address corresponds to a host virtual network interface controller. The example system further includes means for directing the virtual machine data traffic through a packet processor as the virtual machine data traffic traverses the virtual switch and directing the host data traffic to bypass the packet processor as the host data traffic traverses the virtual switch.

An example system of any previous system is provided, where the packet processor is configured to filter the one or more data packets of the virtual machine data traffic according to a filtering policy.

An example system of any previous system is provided, where monitoring the data traffic flowing through the virtual switch includes extracting a MAC address from each of the one or more data packets of the data traffic.

An example system of any previous system is provided, where the extracted MAC address of the data traffic flowing to the host device is a destination MAC address.

An example system of any previous system is provided, where the extracted MAC address of the data traffic flowing from the host device is a source MAC address.

An example system of any previous system is provided, where the evaluation of the MAC address of each of the one or more data packets of the monitored data traffic includes comparing the extracted MAC address of each of the one or more data packets to a list of known MAC addresses. The list of known MAC addresses includes MAC addresses associated with virtual machine data traffic or host data traffic.

An example system of any previous system is provided, where the list of known MAC addresses is stored on an address storage table accessible by a bypass manager of the virtual switch.

An example bypass manager for communicating data traffic including one or more data packets through a virtual switch on a host device is provided. The bypass manager includes one or more processors. The bypass manager includes a data traffic monitor executing on the one or more processors and configured to monitor the data traffic flowing through the virtual switch. The data traffic includes virtual machine data traffic flowing to and from virtual machine processes on the host device and host data traffic flowing to and from host operating system processes on the host device. The bypass manager also includes a data traffic designator executing on the one or more processors and configured to designate one or more data packets of the monitored data traffic as virtual machine data traffic based on an evaluation of a Media Access Controller (MAC) address of the one or more data packets of the monitored data traffic by a data traffic evaluator where the MAC address corresponds to a host virtual network interface controller, the data traffic designator further configured to designate one or more further data packets of the monitored data traffic as host data traffic based on an evaluation of the MAC address of the further one or more data packets of the monitored data traffic where the MAC address corresponds to a host virtual network interface controller. The bypass manager further includes a data traffic director executing on the one or more processors and configured to direct virtual machine data traffic through a packet processor as the virtual machine data traffic traverses the virtual switch and direct host machine data traffic to bypass the packet processor as the host data traffic traverses the virtual switch.

A bypass manager of any previous bypass manager is provided, where the packet processor is configured to filter the one or more data packets of the virtual machine data traffic according to a filtering policy.

A bypass manager of any previous bypass manager is provided, where the data traffic monitor is configured to monitor the data traffic flowing through the virtual switch by extracting a MAC address from each of the one or more data packets of the data traffic.

A bypass manager of any previous bypass manager is provided, where the extracted MAC address of the data traffic flowing to the host device is a destination MAC address.

A bypass manager of any previous bypass manager is provided, where the extracted MAC address of the data traffic flowing from the host device is a source MAC address.

A bypass manager of any previous bypass manager is provided, where the data traffic evaluator is configured to evaluate the MAC address of each of the one or more data packets of the monitored data traffic by comparing the extracted MAC address of each of the one or more data packets to a list of known MAC addresses, the list of known MAC addresses including MAC addresses associated with virtual machine data traffic or host data traffic.

A bypass manager of any previous bypass manager is provided, where the list of known MAC addresses is stored on an address storage table accessible by the data traffic evaluator.

Example one or more tangible processor-readable storage media are embodied with instructions for executing on one or more processors and circuits of a computing device a process of communicating data traffic including one or more data packets through a virtual switch on a host device. The process includes monitoring the data traffic flowing through the virtual switch. The data traffic includes at least virtual machine data traffic flowing to and from virtual machine processes on the host device and host data traffic flowing to and from host operating system processes on the host device. The process further includes designating one or more data packets of the monitored data traffic as virtual machine data traffic based on an evaluation of a Media Access Controller (MAC) address of the one or more data packets of the monitored data traffic where the MAC address corresponds to a virtual machine virtual network interface controller. The process also includes designating further one or more data packets of the monitored data traffic as host data traffic based on an evaluation of the MAC address of each of the one or more data packets of the monitored data traffic where the MAC address corresponds to a host virtual network interface controller. The process also includes directing virtual machine data traffic through a packet processor as the virtual machine data traffic traverses the virtual switch and directing host data traffic to bypass the packet processor as the host data traffic traverses the virtual switch.

Another example one or more tangible processor-readable storage media are embodied with instructions for executing on one or more processors and circuits of a device a process of any preceding process, where the packet processor is configured to filter the one or more data packets of the virtual machine data traffic according to a filtering policy.

Another example one or more tangible processor-readable storage media are embodied with instructions for executing on one or more processors and circuits of a device a process of any preceding process, where monitoring the data traffic flowing through the virtual switch includes extracting a MAC address from each of the one or more data packets of the data traffic.

Another example one or more tangible processor-readable storage media are embodied with instructions for executing on one or more processors and circuits of a device a process of any preceding process, where the extracted MAC address of the data traffic flowing to the host device is a destination MAC address and the extracted MAC address of the data traffic flowing from the host device is a source MAC address.

Another example one or more tangible processor-readable storage media are embodied with instructions for executing on one or more processors and circuits of a device a process of any preceding process, where the evaluation of the MAC address of each of the one or more data packets of the monitored data traffic includes comparing the extracted MAC address of each of the one or more data packets to a list of known MAC addresses, the list of known MAC addresses including MAC addresses associated with virtual machine data traffic or host data traffic.

Another example one or more tangible processor-readable storage media are embodied with instructions for executing on one or more processors and circuits of a device a process of any preceding process, where the list of known MAC addresses is stored on an address storage table accessible by a bypass manager of the virtual switch.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary implementations. Since many implementations can be made without departing from the spirit and scope of the claimed invention, the claims hereinafter appended define the invention. Furthermore, structural features of the different examples may be combined in yet another implementation without departing from the recited claims.

What is claimed is:

1. A method of communicating data traffic through a virtual switch in a host operating system of a host device, the method comprising:

monitoring the data traffic flowing through the virtual switch between a physical network interface controller of the host device and one or more virtual network interface controllers of the host device, the data traffic including at least virtual machine data traffic flowing to and from virtual machine processes on the host device and host data traffic flowing to and from host operating system processes on the host device;

designating one or more data packets of the monitored data traffic, during traversal through the virtual switch, as virtual machine data traffic based on an evaluation of a Media Access Controller (MAC) address of the one or more data packets of the monitored data traffic where the MAC address corresponds to a virtual machine virtual network interface controller;

designating further one or more data packets of the monitored data traffic, during traversal through the virtual switch, as host data traffic based on an evaluation of the MAC address of the further one or more data packets of the monitored data traffic where the MAC address corresponds to a host virtual network interface controller;

directing the virtual machine data traffic through a packet processor of the virtual switch as the virtual machine data traffic traverses the virtual switch; and directing the host data traffic to bypass the packet processor of the virtual switch as the host data traffic traverses the virtual switch.

2. The method of claim 1, wherein the packet processor is configured to filter the one or more data packets of the virtual machine data traffic according to a filtering policy.

3. The method of claim 1, wherein monitoring the data traffic flowing through the virtual switch comprises:

extracting a MAC address from each of the one or more data packets of the data traffic.

4. The method of claim 3, wherein the extracted MAC address of the data traffic flowing to the host device is a destination MAC address.

5. The method of claim 3, wherein the extracted MAC address of the data traffic flowing from the host device is a source MAC address.

6. The method of claim 3, wherein the evaluation of the MAC address of each of the one or more data packets of the monitored data traffic includes comparing the extracted MAC address of each of the one or more data packets to a list of known MAC addresses, the list of known MAC addresses including MAC addresses associated with virtual machine data traffic or host data traffic.

7. The method of claim 6, wherein the list of known MAC addresses is stored on an address storage table accessible by a bypass manager of the virtual switch.

8. A bypass manager for communicating data traffic including one or more data packets through a virtual switch in a host operating system of a host device, the bypass manager comprising:

one or more processors;

a data traffic monitor executing on the one or more processors and configured to monitor the data traffic flowing through the virtual switch between a physical network interface controller of the host device and one or more virtual network interface controllers of the host device, the data traffic including at least virtual machine data traffic flowing to and from virtual machine processes on the host device and host data traffic flowing to and from host operating system processes on the host device;

a data traffic designator executing on the one or more processors and configured to designate one or more data packets of the monitored data traffic, during traversal through the virtual switch, as virtual machine data traffic based on an evaluation of a Media Access Controller (MAC) address of the one or more data packets of the monitored data traffic by a data traffic evaluator where the MAC address corresponds to a virtual machine virtual network interface controller, the data traffic designator further configured to designate one or more further data packets of the monitored data traffic, during traversal through the virtual switch, as host data traffic based on an evaluation of the MAC address of the further one or more data packets of the monitored data traffic where the MAC address corresponds to a host virtual network interface controller; and a data traffic director executing on the one or more processors and configured to direct virtual machine data traffic through a packet processor of the virtual switch as the virtual machine data traffic traverses the virtual switch and direct host machine data traffic of the virtual switch to bypass the packet processor as the host data traffic traverses the virtual switch.

9. The bypass manager of claim 8, wherein the packet processor is configured to filter the one or more data packets of the virtual machine data traffic according to a filtering policy.

10. The bypass manager of claim 8, wherein the data traffic monitor is configured to monitor the data traffic flowing through the virtual switch by extracting a MAC address from each of the one or more data packets of the data traffic.

11. The bypass manager of claim 10, wherein the extracted MAC address of the data traffic flowing to the host device is a destination MAC address.

12. The bypass manager of claim 10, wherein the extracted MAC address of the data traffic flowing from the host device is a source MAC address.

13. The bypass manager of claim 10, wherein the data traffic evaluator is configured to evaluate the MAC address of each of the one or more data packets of the monitored data traffic by comparing the extracted MAC address of each of the one or more data packets to a list of known MAC addresses, the list of known MAC addresses including MAC addresses associated with virtual machine data traffic or host data traffic.

14. The bypass manager of claim 13, wherein the list of known MAC addresses is stored on an address storage table accessible by the data traffic evaluator.

15. One or more tangible processor-readable storage media of a tangible article of manufacture encoding processor-executable instructions for executing on a computer system a process of communicating data traffic including one or more data packets through a virtual switch in a host operating system of a host device, the process comprising:

monitoring the data traffic flowing through the virtual switch between a physical network interface controller of the host device and one or more virtual network interface controllers of the host device, the data traffic including at least virtual machine data traffic flowing to and from virtual machine processes on the host device and host data traffic flowing to and from host operating system processes on the host device;

designating one or more data packets of the monitored data traffic as virtual machine data traffic, during traversal through the virtual switch, based on an evaluation of a Media Access Controller (MAC) address of the one or more data packets of the monitored data traffic where the MAC address corresponds to a virtual machine virtual network interface controller;

designating further one or more data packets of the monitored data traffic, during traversal through the virtual switch, as host data traffic based on an evaluation of the MAC address of each of the one or more data packets of the monitored data traffic where the MAC address corresponds to a host virtual network interface controller;

directing virtual machine data traffic through a packet processor of the virtual switch as the virtual machine data traffic traverses the virtual switch; and directing host data traffic to bypass the packet processor of the virtual switch as the host data traffic traverses the virtual switch.

16. The one or more tangible processor-readable storage media of claim 15, wherein the packet processor is configured to filter the one or more data packets of the virtual machine data traffic according to a filtering policy.

17. The one or more tangible processor-readable storage media of claim 15, wherein monitoring the data traffic flowing through the virtual switch comprises:

extracting a MAC address from each of the one or more data packets of the data traffic.

18. The one or more tangible processor-readable storage media of claim 17, wherein the extracted MAC address of the data traffic flowing to the host device is a destination MAC address and the extracted MAC address of the data traffic flowing from the host device is a source MAC address.

19. The one or more tangible processor-readable storage media of claim 17, wherein the evaluation of the MAC address of each of the one or more data packets of the monitored data traffic includes comparing the extracted MAC address of each of the one or more data packets to a list of known MAC addresses, the list of known MAC addresses including MAC addresses associated with virtual machine data traffic or host data traffic.

20. The one or more tangible processor-readable storage media of claim 19, wherein the list of known MAC addresses is stored on an address storage table accessible by a bypass manager of the virtual switch.

* * * * *